UNITED STATES PATENT OFFICE.

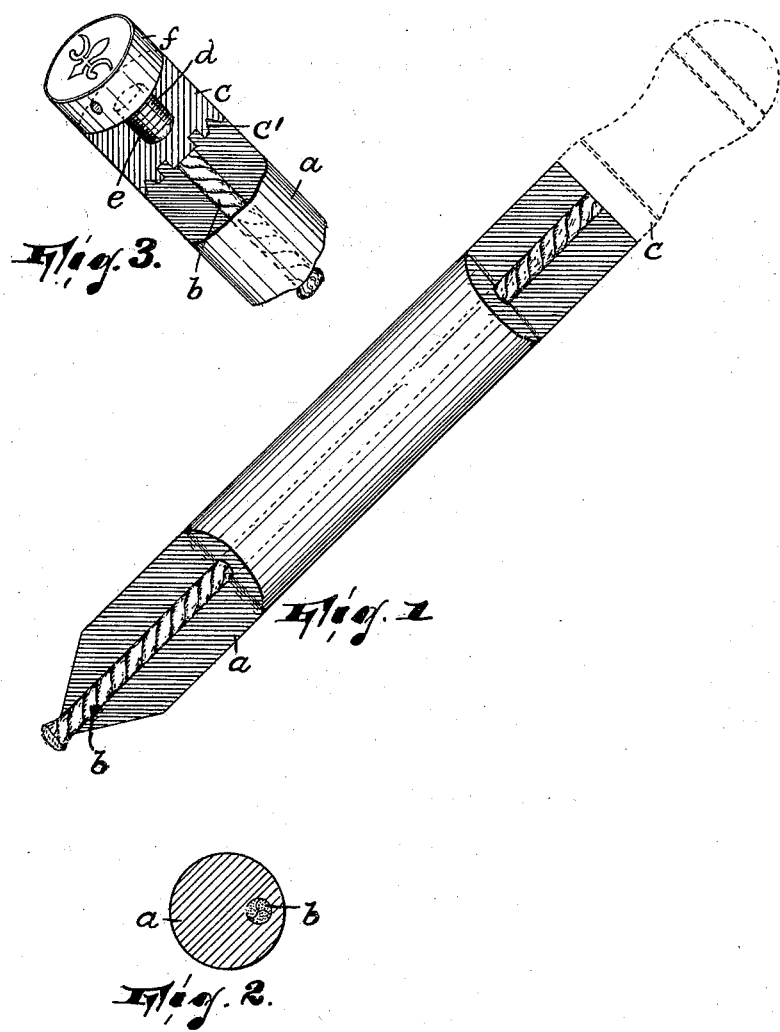

THOMAS ARDIZONE, OF BROOKLYN, NEW YORK, ASSIGNOR TO JOHN MURPHY, OF BROOKLYN, NEW YORK.

PREPARED SEALING-WAX.

SPECIFICATION forming part of Letters Patent No. 709,132, dated September 16, 1902.

Application filed January 8, 1902. Serial No. 88,873. (No model.)

*To all whom it may concern:*

Be it known that I, THOMAS ARDIZONE, a citizen of the United States, residing in Brooklyn, Kings county, and State of New York, have invented certain new and useful Improvements in Prepared Sealing-Wax; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to the manufacture of sealing-wax; and it has for its object the production of an article of manufacture comprising a stick of sealing-wax and so constructed as to materially enhance its value in point of convenience in applying it and neatness of results.

My invention will be found fully illustrated in the accompanying drawings, wherein—

Figure 1 shows my improved stick of sealing-wax partly in section and partly in elevation. Fig. 2 is a transverse sectional view. Fig. 3 illustrates a modification of the invention.

In carrying out my invention when the stick $a$ of wax is formed a wick $b$ of some suitable material is introduced into the soft wax in such manner that when it hardens it will form a secured longitudinal core for the stick. In order to insure the wick's burning with a steady flame, it may previous to being incased in the wax be saturated with some substance which will augment its quality of combustibility. In order to give to the finished article the maximum of waxing-surface, together with the self-heating quality afforded by the wick, the latter is placed eccentrically of the stick, as shown in Fig. 2.

In order that short ends may be used up instead of being discarded, each stick may be provided with a handle $c$. In Fig. 1 this handle is shown as simply secured to the end of the stick, either by virtue of the quality of adhesion in the stick itself or by some suitable cement. By grooving the end of the handle, as at $c'$, the effect of the adhesion will be enhanced. If desired, this handle may be provided with a threaded bore $d$ in its end, into which may be screwed the threaded stem $e$ of a detachable die or seal $f$.

Having thus fully described my invention, what I claim as new, and desire to secure by Letters Patent, is—

1. As an article of manufacture, a stick of sealing-wax having a wick forming a longitudinal core therein, said wick being disposed eccentrically in the stick, substantially as described.

2. As an article of manufacture, in combination, a stick of sealing-wax having a wick forming a longitudinal core therein, and a handle secured to one end of said stick, the adjacent faces of the stick and handle having engaging projections and recesses, substantially as described.

In testimony that I claim the foregoing I have hereunto set my hand this 28th day of December, 1901.

THOMAS ARDIZONE.

Witnesses:
JULIUS LEHRENKRAUSS, Jr.,
HENRY STIRLING.